Mar. 6, 1923.
F. O. WELLS
TAP FOR CUTTING THREADS
Filed May 25, 1920
1,447,700
2 sheets-sheet 1
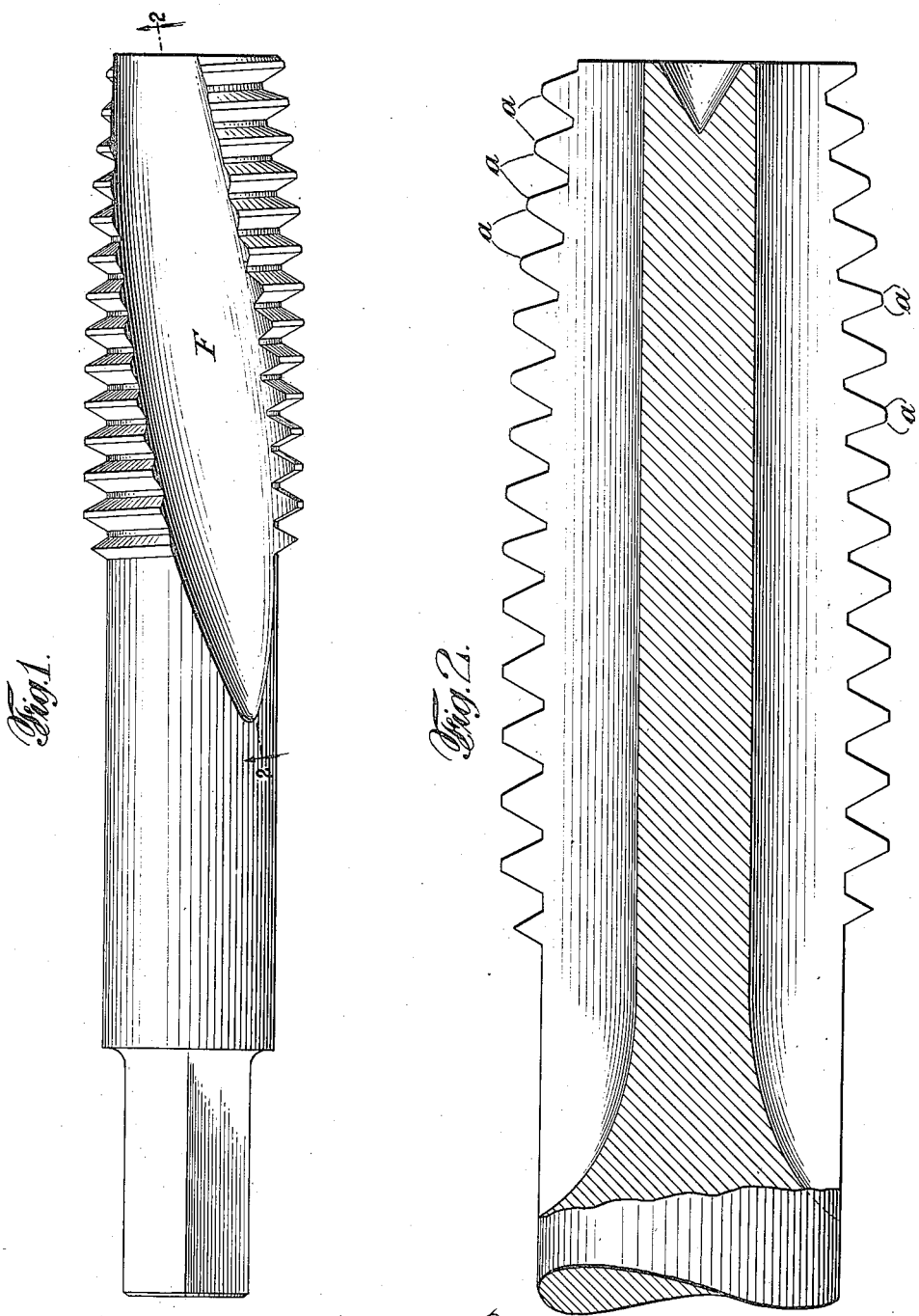

Mar. 6, 1923.
F. O. WELLS
1,447,700
TAP FOR CUTTING THREADS
Filed May 25, 1920
2 sheets-sheet 2
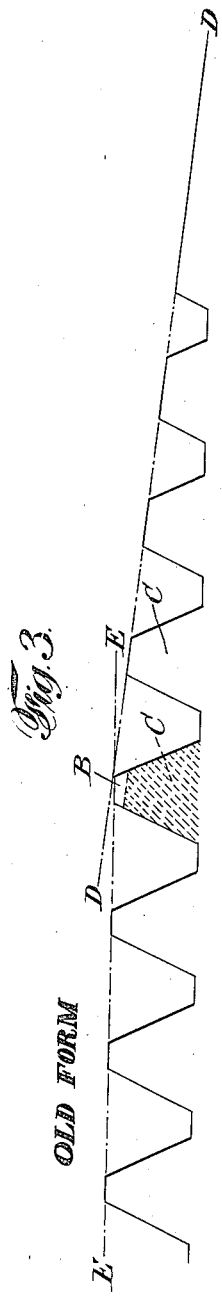
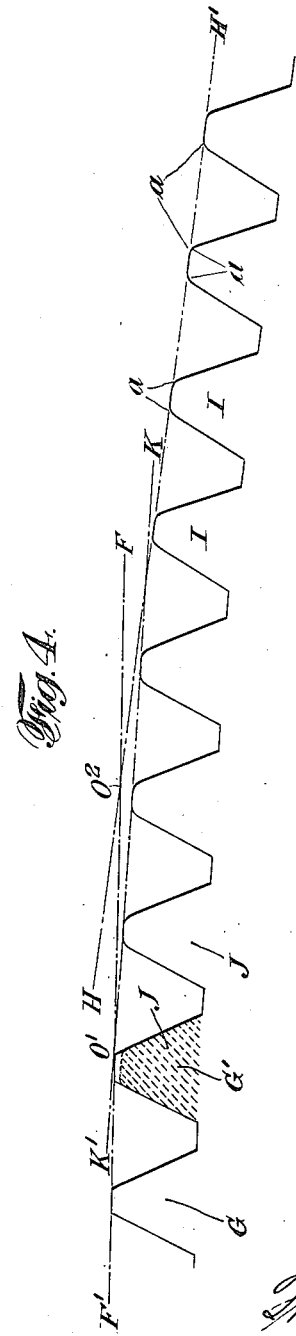
INVENTOR
Frank O. Wells,
BY
Pringle, Wright & Niall.
ATTORNEYS Patented Mar. 6, 1923.

1,447,700

UNITED STATES PATENT OFFICE.

FRANK O. WELLS, OF GREENFIELD, MASSACHUSETTS.

TAP FOR CUTTING THREADS.

Application filed May 25, 1920. Serial No. 384,068.

*To all whom it may concern:*

Be it known that I, FRANK O. WELLS, a citizen of the United States, residing at Greenfield, in the county of Franklin and State of Massachusetts, have invented a certain new and useful Improvement in a Tap for Cutting Threads, of which the following is a specification.

The object of my invention has been to provide an improved tap for cutting threads which shall be more efficient and more durable than previous taps and to such ends my invention consists in the tap for cutting threads hereinafter specified.

Fig. 1 is a side elevation of a tap forming one embodiment of my invention.

Fig. 2 is a longitudinal sectional view of such tap on the line 2—2 of Fig. 1.

Fig. 3 is an exaggerated diagrammatic view showing the relations of the threads on the chamfers of an ordinary tap, and Fig. 4 is an exaggerated diagrammatic view showing the relations of the threads on the chamfers of the tap in Fig. 1 to the first full thread.

While in the drawings I have illustrated the best embodiment of my invention known to me, my invention is capable of embodiment in other forms, and the illustrated embodiment is to be regarded only as typical of my invention, and my invention is not to be confined thereto.

Prior to my invention, the loss of taps by breakage of the tap has been very great, and the threads on the chamfer or tapered portion have been able to stand a very insufficient amount of wear and have broken to some extent. As the threads on the chamfer have to do almost all the cutting, they are subjected to heavy wear, and, as previously made, their useful life has been comparatively short. Furthermore, when these threads become worn and dull, the resistance to their being forced through the metal which is to contain the female threads is severe, and such resistance subjects the tap to a greatly increased torsion which frequently causes them to break. Also the strains upon the chamfer threads are very great when the axis of the tap is tilted relative to the axis of the hole in which the threads are to be cut or inserted in a hole formed in an uneven surface, as is likely to be the case where the tap is operated by hand.

One of the objects of my invention has been to overcome these faults. This object I accomplish by so forming the threads, especially on the chamfer, that the sharp corners at the tops of the threads will be avoided, as this change I find will, to a great extent, avoid the wear on such threads. Accordingly, I round the upper edges "*a*" of the threads on the chamfer or tapered portion, as shown in Fig. 2. Or, I may accomplish the same result by bevelling these corners instead of rounding them, or by any other form of flattening. The rounding of the upper corners on said threads on the chamfer does not materially lessen the advantages of their cutting action, since the threads on the cylindrical portion of the tap will give the final angular shape to the threads to be cut, but such rounding or flattening of the corners gives to the threads on the chamfer a shape which, as stated, will enable them more readily to stand the wear and endure the severe strains to which they are subjected.

In taps prior to may invention, the first full thread at the top of the chamfer has been much more likely to wear or to break than the remaining full threads on the tap, because the said thread has had to perform very heavy duty in cutting.

A second object of my invention has been to overcome this defect.

In all taps previous to my invention, so far as known to me, there has been but a single chamfer. It has been necessary that the smallest thread on the chamfer should not be substantially larger than the hole in which the threads are to be cut, while the other threads on the chamfer should increase in radius nearly to the radius of the first full thread. Also, for economy's sake, it has not been desirable to make the chamfer very long. The result has been that the difference between the last thread on the chamfer and the first full thread in radius and cutting cross-section has been quite marked, so that the first full thread has had to do a disproportionate amount of cutting. Due to these causes, the said thread has worn rapidly and the strain of forcing the dull thread through the metal has frequently broken the tap and sometimes broken the thread. I have illustrated this condition in exaggerated form in Fig. 3. In this figure, the first full thread B is shown at the point of intersection of the line E—E touching the tops of the full or cylindrical threads with the line D—D touching the tops of the threads on the chamfer or taper. It will be seen that the radius of the top of the first full thread B is considerably greater than that of the neighboring thread C on the chamfer and that the thread B has to do a very large amount of cutting over and above what is done by the threads on the chamfer.

In Fig. 4 I have illustrated diagrammatically, and to an exaggerated extent, one construction of tap by which I overcome the fault above pointed out sufficiently to greatly prolong the life of the first full thread and to lessen the strains upon it.

In all taps previous to my invention, so far as known to me, the partial or roughing out threads have been formed on a single chamfer. By using a plurality of chamfers on the tap, I am able to accomplish the said object. The line F—F' is the line of the tops of the full threads G, G', etc. The line H—H' is the line of the tops of reduced threads I—I formed on a chamfer, which, for instance, is of the same taper as the chamfer in Fig. 3. In order that the partial thread J nearest the first full thread G may more nearly complete the thread to be cut, so as to leave only a reasonable amount of cutting for the thread G to do, I form the thread J (and other neighboring threads also in actual practice) upon a chamfer which may be represented by the line K—K', the angle K', O', F' being considerably smaller than the angle H', O², F' of the ordinary chamfer. It will be seen that by thus forming the partial threads upon two or more chamfers, the work left by those threads for the first full thread to perform can be reduced to such an extent as not to unduly wear or strain the said thread or the tap.

In Fig. 3 I have indicated the amount of cutting left for the first full thread B to do by showing on thread B the cross-section of thread C by means of cross-hatching. The area of the cross-section of thread B not covered by the cross-section of thread C represents the cutting required to be done by thread B. Similarly, in Fig. 4, I have represented, by dotted cross-hatching, the cross-section of thread J upon thread G. It will be seen that the uncovered portion of the cross-section of thread G is much less than that of thread B and that by my use of a plurality of tapers I have very substantially reduced the amount of work to be done by the first full thread, thus prolonging its life, reducing the danger of breakage of the tap and reducing the danger of breaking the thread. It will of course be understood that the same result could be obtained by forming the tops of the partial threads on a curved line, instead of on the series of chamfers. While in smaller taps, I would ordinarily use only two tapers or chamfers, in some larger taps three or more chamfers would be an advantage. In Fig. 4, I have shown the corners "a" of the threads on the chamfers as rounded, as described in connection with Figs. 1 and 2.

In some instances I prefer to form the bottoms as well as the tops of the partial threads on a chamfer, as shown in Figs. 1, 2 and 4.

Each of the features of my invention works particularly well when combined with a spiral flute F, cut on a spiral as shown in Fig. 1, rather than with a straight flute or one cut parallel to the axis of the tap, although the said features can be used with the latter form of flute.

My improvements, as stated, will reduce the wear on the threads and will greatly reduce the breakage in taps, and since a large majority of taps break before they have time to wear out, such improvements are of large importance in their field.

If desired, the full threads also may have their corners rounded or flattened.

I claim:

1. A tap having a full thread with sharp corners preceded by a thread of substantially the same diameter but with a blunted upper corner.

2. A tap having a full thread with sharp corners preceded by a cutting thread of substantially the same diameter but with a blunted corner, said tap also having a thread upon a chamfer which has a blunted upper corner.

3. A tap having full threads with sharp corners, a full thread with a blunted upper corner, and a thread upon a chamfer having a blunted corner.

4. A tap having a chamfered end and having a thread upon a chamfer, which thread has a blunted upper corner.

5. A tap having a thread upon a chamfer, and having a conical upper surface with a blunted corner at the edge of such surface.

6. A tap having a thread upon a chamfer, which thread is provided with a conical upper surface, the edges of such surface being rounded.

7. In a tap, the combination of a full thread with sharp corners preceded by a thread upon a chamfer having a rounded upper surface and a slanting flute.

8. A tap having a full thread and reduced threads, the tops of the reduced threads being formed in successive groups on a plurality of lines so as to approach more nearly to parallelism to the axis of the tap as they approach said full thread.

9. In a tap, the combination of a full thread and a plurality of sets of reduced threads, the tops of said sets being progressively formed on lesser straight tapers or chamfers considered in a direction from the point of the tap toward said full thread.

10. In a tap, the combination of a full thread and a plurality of sets of reduced threads, the tops of said sets being progressively formed on lesser straight tapers or chamfers considered in a direction from the point of the tap toward said full thread, and said tap also having a spiral or slanting flute.

11. A tap having a cylindrical portion and a plurality of chamfered portions, a thread or threads on the chamfered portion having blunted upper corners.

12. A tap having a cylindrical portion and a plurality of chamfered portions, a thread or threads on the chamfered portion having blunted upper corners, and said tap also having a spiral or slanting flute.

In testimony that I claim the foregoing, I have hereunto set my hand this 21st day of May, 1920.

FRANK O. WELLS.